(12) United States Patent
Seger

(10) Patent No.: US 8,700,229 B2
(45) Date of Patent: Apr. 15, 2014

(54) METHOD FOR CONTROLLING A DRIVER ASSISTANCE SYSTEM, AND DRIVER ASSISTANCE SYSTEM

(75) Inventor: Ulrich Seger, Leonberg-Warmbronn (DE)

(73) Assignee: Robert Bosch GmbH, Stuttgart (DE)

( * ) Notice: Subject to any disclaimer, the term of this patent is extended or adjusted under 35 U.S.C. 154(b) by 749 days.

(21) Appl. No.: 12/735,112

(22) PCT Filed: Nov. 10, 2008

(86) PCT No.: PCT/EP2008/065232
§ 371 (c)(1),
(2), (4) Date: Sep. 29, 2010

(87) PCT Pub. No.: WO2009/086966
PCT Pub. Date: Jul. 16, 2009

(65) Prior Publication Data
US 2011/0015805 A1      Jan. 20, 2011

(30) Foreign Application Priority Data
Jan. 9, 2008    (DE) .......................... 10 2008 003 666

(51) Int. Cl.
*G05D 1/00*    (2006.01)
*G05D 3/00*    (2006.01)
*G06F 7/00*    (2006.01)
*G06F 17/00*   (2006.01)

(52) U.S. Cl.
USPC ............................................................ 701/1

(58) Field of Classification Search
USPC ............................................................ 701/1
See application file for complete search history.

(56) References Cited

U.S. PATENT DOCUMENTS

2008/0065293 A1    3/2008   Placke et al.

FOREIGN PATENT DOCUMENTS

| | | |
|---|---|---|
| DE | 101 14 470 | 9/2002 |
| DE | 10 2004 048 530 | 4/2006 |
| DE | 10 2004 051 963 | 5/2006 |
| DE | 10 2005 024 382 | 12/2006 |
| DE | 10 2005 048 014 | 4/2007 |
| DE | 10 2007 015 879 | 10/2008 |
| EP | 1 977 946 | 10/2008 |
| EP | 1 990 250 | 11/2008 |
| JP | 11-39598 | 2/1999 |
| JP | 2000-198458 | 7/2000 |
| JP | 2001-39326 | 2/2001 |
| JP | 2003-162799 | 6/2003 |
| JP | 2007-176265 | 7/2007 |
| JP | 2007-316018 | 12/2007 |
| WO | WO 2006/037445 | 4/2006 |
| WO | WO 2006/125709 | 11/2006 |
| WO | WO 2008/020071 | 2/2008 |

*Primary Examiner* — Maceeh Anwari
(74) *Attorney, Agent, or Firm* — Kenyon & Kenyon LLP

(57) ABSTRACT

A method for controlling a driver assistance system having sensors for recording the vehicle's environment and a device for intervening in onboard systems of the vehicle as a function of output signals of the sensors, the driver assistance system recording at least the course of a travel lane along which the vehicle is traveling and the position of the vehicle with respect to the travel lane, and guiding the vehicle on a trajectory; in this context, the driver assistance system establishes the trajectory as a function of the driver request.

11 Claims, 3 Drawing Sheets

METHOD FOR CONTROLLING A DRIVER ASSISTANCE SYSTEM, AND DRIVER ASSISTANCE SYSTEM

BACKGROUND OF THE INVENTION

1. Field of the Invention

The present invention relates to a method for controlling a driver assistance system and a driver assistance system.

2. Description of Related Art

Driver assistance systems are known which warn the driver of a vehicle before he leaves a traffic lane or support him in keeping to a chosen traffic lane. For this purpose, the driver assistance system includes assistance functions such as LDW (lane departure warning) and/or LKS (lane keeping support). Assistance function LDW warns the driver of leaving the traffic lane by generating optical and/or acoustic and/or haptic signals. Assistance function LKS intervenes actively in onboard systems of the vehicle, particularly in the steering system, in order to keep a vehicle, that is deviating from the traffic lane, in the traffic lane. For this purpose, the driver assistance system includes a sensor system including, in particular, at least one video sensor for detecting traffic lane markings or the like.

Driver assistance systems known up to now, having a transverse guidance function, such as LDW, LKS or an automatic transverse guidance in a traffic jam assistance system, attempt to guide the vehicle as much as possible to the middle of the traffic lane. Most drivers, however, perceive it rather as disagreeable to keep strictly accurately to the middle of their own traffic lane when a vehicle in an adjacent traffic lane is traveling very close to the boundary of their own traffic lane or even crosses the traffic lane boundary, and thus reaches onto their own traffic lane. This situation is perceived as being unpleasant or even threatening if the vehicle on the adjacent lane is a large vehicle, such as a commercial vehicle or a bus.

For the controlling of a driver assistance system, it is known from DE 102007015879.5 that one may monitor the vehicle environment for obstacles, and when an obstacle is detected, to change the setpoint trajectory of the vehicle in such a way that passing the detected obstacle without danger is made possible. A safety range assigned to each obstacle is preferably specified in this context, whose size may advantageously also depend on the size of the obstacle.

Furthermore, a driver assistance system having a lane keeping function is known from DE 102005048014.4, including a device for recognizing the traffic lane on the roadway, a control device for intervention in the steering system of the vehicle in the sense of lane holding, means being provided for detecting cornering of the vehicle. The control device exercises its control function as a function of the position of the vehicle in the traffic lane, and as a function of cornering.

A lane changing assistant is known from published German patent document DE 101 14 470 A1 that has a video system as its sensor device. Using the sensor device, traffic lane markings on the roadway are able to be detected, and with that, also the transverse position of one's own vehicle, with respect to the currently traveled traffic lane. If the transverse position of the vehicle deviates by more than a certain tolerance limit to one side or the other of the center of the lane, a regulating intervention in the steering automatically takes place, so as to return the vehicle approximately to the center of the lane. This raises driver comfort for the driver and also increases the travel safety, since the driver is able to concentrate completely on the traffic situation. If the driver deliberately wants to undertake a change of lane, however, for instance, for initiating a passing process, then, in the case of an active lane holding function, he has to exert a greater force on the steering wheel, in order to overcome the forces caused by the regulating intervention of the lane holding assistant. For this reason, it is provided in the known system that the lane holding function is deactivated at least temporarily when a lane change intention of the driver is detected, for example, with the aid of the operation of the turn signal indicator.

Moreover, a lane holding assistant for motor vehicles is known from DE 102 005 024 382.7 that has a sensor device for detecting the traffic lane on the roadway, having a control device which exerts a force on the steering of the vehicle via an actuator, so as to hold the vehicle in the lane, and having a device for recognizing the lane change intention of the driver. The control device, in this instance, is developed in such a way that when the lane change intention is detected, the force exerted on the steering system is able to be modified asymmetrically within the meaning of an easier lane change. Furthermore, when the lane change intention from one's own lane to a target lane has been detected, the amount of the force exerted upon the steering system of the vehicle is a function of the deviation of the vehicle from the setpoint trajectory in such a way that the force for transverse positions between the setpoint trajectory in one's own lane and the setpoint trajectory in the target lane is reduced or is equal to zero, but increases again on the other side of the setpoint trajectory of the target lane.

A device for determining the possibility of passage for a vehicle at obstacles is known from published German patent document DE 10 2004 015 749 A1, and it is used to estimate whether a vehicle is able to pass through between obstacles with respect to its height and/or its width. The device includes a sensor unit for measuring the passage width between obstacles and/or a passage height below obstacles and an evaluation unit, the passage width ascertained and/or the passage height ascertained being compared to a vehicle width and/or a vehicle height in such a way that a warning is emitted for the case in which the ascertained passage height and/or the ascertained passage width does not permit the passage of the vehicle at the obstacles.

SUMMARY OF THE INVENTION

In the procedure described below, the individual driving behavior of the driver is more greatly taken into account. As reference variable of the LKS function of the driver assistance system, no longer is the center of a detected traffic lane drawn upon, but rather a trajectory that is adapted to the preference of the driver.

Because of the adaptation of the controlling behavior of the driver assistance system to the driving style of the driver, interventions of the driver assistance system in response to an active LKS assistance function appear more familiar to the driver. For this reason, he is also willing to accept such interventions more readily, since they essentially correspond to his style of driving.

According to the request of the driver, a mode of choice may be selected according to which the driver assistance system establishes and follows an optimized trajectory for guiding the vehicle. The request of the driver may advantageously be established by a switching device or the like that is operable by the driver. In a similar way to a transmission control, the characteristics of the vehicle corresponding to the desired selection mode may already be specified during its calibration. Alternatively, the driver's request may be recorded automatically by having an adaptive driver assistance system record the manner of driving of the driver and evaluating it. Two modes of choice are advantageously provided which correspond to a dynamic or a defensive manner of driving of the driver, respectively. One optimized trajectory for the vehicle is then established as a function of the respectively selected mode of choice. In the case of the selection of a mode of choice characterizing a dynamic manner of driving, the trajectory of the vehicle is established in such a way that, when driving into a curve of the traffic lane, the vehicle is guided in an oriented manner rather to the outer side of the traffic lane, that the vehicle at the zenith of trajectory of the curve is guided to the inner side of the traffic lane, and that, at the exit from the curve, the vehicle is essentially guided again to the center of the traffic lane. In the case of the selection of a mode of choice characterizing a defensive manner of driving, the trajectory of the vehicle is advantageously established in such a way that, when driving into a curve of the traffic lane, the vehicle is guided in an oriented manner rather to the center of the traffic lane, that the vehicle at the zenith of trajectory of the curve is guided rather to the inner side of the traffic lane, and that, at the exit from the curve, the vehicle is essentially guided again at the center of the traffic lane. When an obstacle is detected in the traffic lane, the trajectory corresponding to the mode of choice is advantageously modified in such a way the vehicle is guided past the obstacle free of risk. After the passing of the obstacle, the vehicle is guided again on the trajectory corresponding to the mode of choice.

BRIEF DESCRIPTION OF THE DRAWINGS

Specific embodiments of the present invention are explained in greater detail below with reference to the drawings. The figures show.

DETAILED DESCRIPTION OF THE INVENTION

Figure 1:
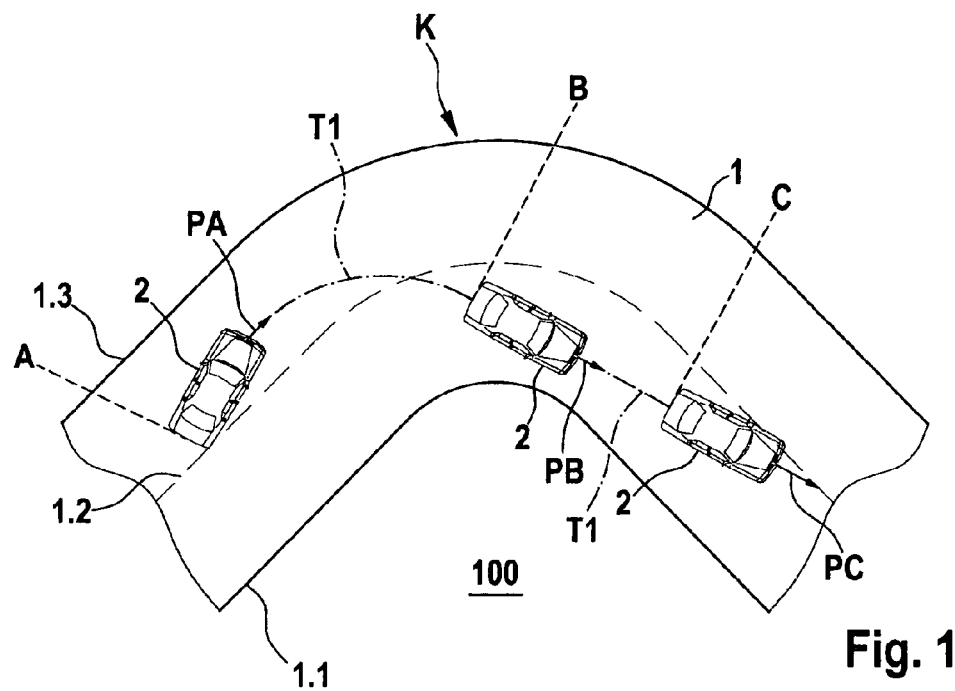
FIG. 1 shows a top view of a road space.

Specific embodiments of the present invention are explained in greater detail below with reference to the drawing. Transverse guidance systems known up to now, such as LDW, LKS or an automatic transverse guidance in a traffic jam assistance system attempt, as a rule, to guide the vehicle to the center of the detected traffic lane. Most drivers find this at least uncomfortable, since the preference for the center of the traffic lane, conditioned by the system, deviates from the manner of driving preferred in an individual way by the driver. Now, this is where the present invention comes in, and makes possible a driver-individual adaptation of a control method for a driver assistance system. An adaptation to a different driving behavior of one and the same driver is possible, in this context. Thus, for example, within the scope of a first alternative, a first mode of choice is possible, which corresponds to a progressive, dynamic, anticipative driving style. Within the scope of a second alternative, a second mode of choice is possible which would tend to correspond more to a defensive style of driving. We shall now discuss the first mode of choice, with reference to FIG. 1. FIG. 1 shows a top view of a road space 100 having a travel lane 1. Travel lane 1 is bounded by markings 1.1, 1.3. The center of travel lane 1 is marked by reference numeral 1.2. A vehicle 2 equipped with a driver assistance system moves in travel lane 1 and drives through a curve K of travel lane 1. Successive positions in time of vehicle 2 are designated by letters A, B and C. In the first mode of choice which will now be described first, vehicle 2 drives into position A in curve K of travel lane 1. Depending on the dynamic style of driving of the driver, the direction of vehicle 2 designated by arrow PA tends to be oriented to the outer side of travel lane 1. Thus, vehicle 2 is not located at the center 1.2 of the travel lane, but rather tends to orient itself to markings 1.3 of travel lane 1. At the zenith of trajectory of curve K, corresponding to position B of vehicle 2, the driver assistance system directs vehicle 2 in the direction of arrow PB, that is, towards the inner side of travel lane 1 designated by markings 1.1. In the exit range of curve K, corresponding to position C of vehicle 2, the driving direction of vehicle 2 aims again at center 1.2 of the travel lane, corresponding to arrow PC. The trajectory of vehicle 2, described above, is determined upon the selection of the first mode of choice by the driver assistance system. The driver assistance system determines the curve of travel lane 1 and the relative position of vehicle 2 with respect to travel lane 1 in a manner known per se, by detecting markings 1.1, 1.2, 1.3 bordering travel lane 1, using an onboard sensor system which, in particular, includes at least one video sensor. In a particularly advantageous manner, the position of vehicle 2 may also be determined using the data of a digital map of a navigation system which is supported by satellites (especially the GPS system). Using the data of the digital map, the driver assistance system is particularly advantageous able to determine those positions A, B, C in which advantageously a modification of the travel direction of vehicle 2 is to be undertaken, so that trajectory T may be traveled that corresponds to the mode of choice selected.

Figure 2:
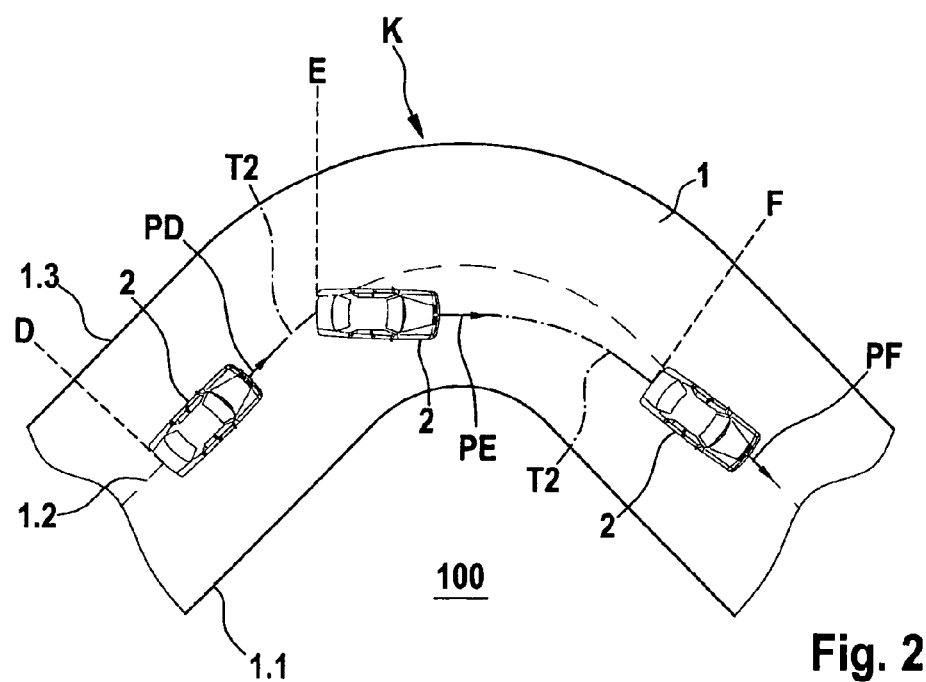
FIG. 2 shows a top view of a road space.

A second mode of choice, which rather corresponds to a defensive manner of driving, will be explained below, with reference to FIG. 2. FIG. 2 also shows again a top view of a schematically shown road space 100 having a travel lane 1. Travel lane 1 is bounded by markings 1.1, 1.3. The center of travel lane 1 is marked by reference numeral 1.2. A vehicle 2 moves in travel lane 1. Vehicle 2 located at position D is driving into curve K of travel lane 1. As a result of the defensive method of driving, the driver assistance system orients the vehicle in the direction of arrow PD, that is, in the direction towards the center 1.2 of travel lane 1. At the zenith of trajectory of curve K the vehicle is guided rather in the direction of arrow PD, that is, in the direction towards the inner side of travel lane 1. In the exit of curve K, vehicle 2 is guided again in the direction of arrow PF, that is, again towards the center 1.2 of travel lane 1. As a result of the manner of driving rather being defensive, vehicle 2 thus moves on trajectory T2.

Figure 3:
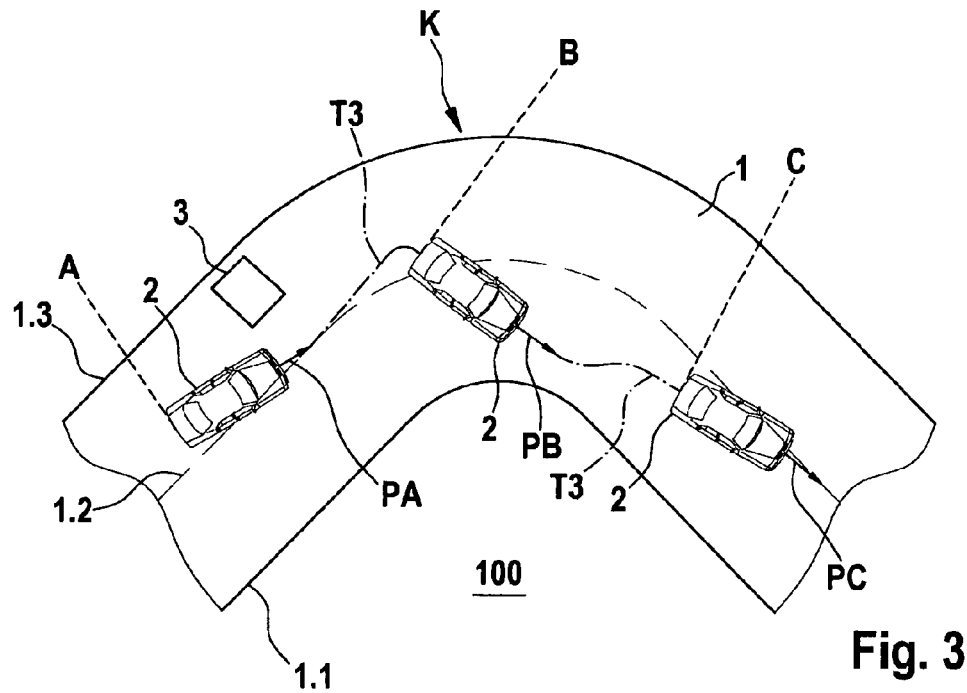
FIG. 3 shows a top view of a road space.

It is already known from DE 10 2007 015 879.5 that, after detecting an obstacle, one may modify the setpoint trajectory of a vehicle in such a way that it is possible to pass the detected obstacle without danger. This measure, too, may advantageously be combined with the present invention, as will be explained below in exemplary fashion, with reference to FIG. 3 and FIG. 4. FIG. 3 essentially shows road space 100 that was shown in FIG. 1. Furthermore, it is assumed that a driver assistance system, that is set to a dynamic manner of driving, guides vehicle 2 through a curve K of travel lane 1. Deviating from the traffic situation shown in exemplary fashion in FIG. 1, FIG. 3 now shows an obstacle 3, which is located in the entry of curve K, on the left side of travel lane 1. This obstacle 3 may be a vehicle parking there, or even a slowly traveling vehicle, for example.

Now, according to the present invention, the driver assistance system is controlled in such a way that, in the situation described, the trajectory of vehicle 2 does not pass the outer edge of travel lane 1, as was shown, however, in FIG. 1. Trajectory T3 is rather selected, which runs rather on the center 1.2 of travel lane 1. In this way, obstacle 3 is able to be passed without danger. To the extent that the traffic situation permits again, that is, obstacle 3 lies behind vehicle 2, the driver assistance system controls vehicle 2 to run again on the trajectory corresponding to the dynamic manner of driving.

Figure 4:
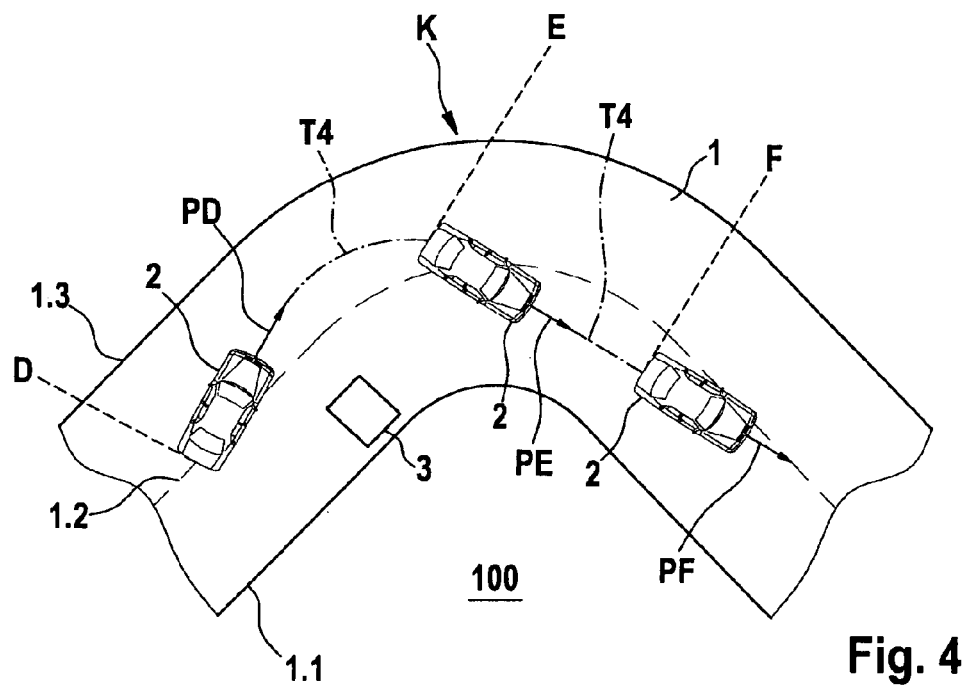
FIG. 4 shows a top view of a road space.

FIG. 4 makes clear an analogous control behavior in response to the defensive manner of driving, corresponding to the second mode of choice. Since there is an obstacle 3 at the entry of curve K of travel lane 1, vehicle 2 is guided in the direction of arrow PD along trajectory T4, which deviates from center 1.2 of travel lane 1. After passing obstacle 3 without disturbance, vehicle 2 is guided once again onto the trajectory corresponding to the preselected defensive manner of driving.

Within the scope of the present invention, it is furthermore advantageously possible to take into account additional influential variables on the trajectories corresponding to the modes of choice. These influential variables may be specific to the vehicle, the environment, or may even include any combination of these influential variables, to the extent that they are present during the operation of vehicle 2. Among the vehicle-specific influential variables taken into account may be, for example, parameters of vehicle 2, such as the maximum possible transverse acceleration, the current load of the vehicle, the state of the tires or the like. Among the environmental influential variables taken into account may be, for example, the enlargement or maintenance state of the roadway that includes travel lane 1. In the case of the environment-specific influential variables, weather and visibility conditions may be taken into consideration. The assumption is that appropriate sensors are present to record these influential variables.

Figure 5:
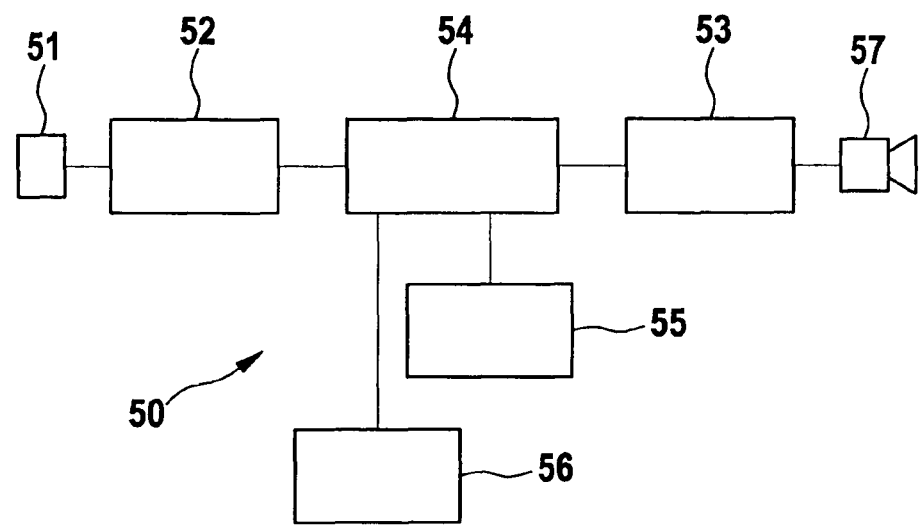
FIG. 5 shows a block diagram of a driver assistance system.

A block diagram of a driver assistance system 50, suitable for carrying out the method according to the present invention, is shown in FIG. 5. Driver assistance system 50 includes, for instance, a functional module 53 (LDW=lane departure warning), a functional module 55 (LKS=lane keeping support) and perhaps additionally a functional module 52 (LCA=lane change aid). Furthermore, at least one video sensor 57 and one radar sensor 51 may be provided. At their output side, the functional modules mentioned are connected to a functional module coordination 54. With the aid of at least one video sensor 51 functional module 53 of driver assistance system 50 records markings 1.1, 1.3 of travel lane 1, in order thus, in particular, to detect the course of travel lane 1. Using the cooperation of the at least one radar sensor, obstacles 3 in one's own travel lane 1 are detected. Functional module 54 is connected to functional module 52 and 53 and controls them. Provided an obstacle 3 is detected, at least one warning signal may be output via functional module 56. In this instance, an optical and/or acoustical and/or haptic warning signal and/or any combination of these warning signals are possible. Moreover, via a functional module 55, interventions may be made in onboard systems of vehicle 2, such as especially the steering system, the braking system, an ESP system or the like, in order to guide vehicle 2 onto a desired trajectory.

What is claimed is:

1. A method for controlling a driver assistance system which has sensors for recording the vehicle's environment and a device for intervening in onboard systems of the vehicle as a function of output signals of the sensors, comprising:
the driver assistance system recording at least a course of a travel lane along which the vehicle is traveling and a position of the vehicle with respect to the travel lane, and guiding the vehicle on a trajectory;
wherein:
the driver assistance system establishes the trajectory as a function of a driver's request to drive according to a driving style selected from a plurality of profiles, each profile denoting a respective driving style, one of the styles being a dynamic mode;
the driver assistance system automatically detects the driver's request by detecting a manner of driving of the driver; and
when the dynamic mode is selected, the trajectory of the vehicle is established in such a way that:
when driving into a curve of the traffic lane, the vehicle is guided in an oriented manner to an outer side of the traffic lane;
at a zenith of trajectory of the curve, the vehicle is guided to an inner side of the traffic lane; and
at an exit of the curve, the vehicle is essentially guided to the center of the traffic lane.

2. The method as recited in claim 1, wherein:
the styles denoted by the plurality of profiles further include a defensive mode;
the dynamic mode corresponding to a dynamic manner of driving and the defensive mode corresponding to a defensive manner of driving; and
the driver assistance system establishes the trajectory differently for the defensive mode than for the dynamic.

3. The method as recited in claim 2, wherein characteristics of the vehicle corresponding to each mode are established during calibration.

4. The method as recited in claim 2, wherein, in response to detection of an obstacle in the travel lane, the trajectory of the vehicle corresponding to the selected mode is modified in such a way that the vehicle is guided past the obstacle without risk.

5. The method as recited in claim 4, wherein, after passing the obstacle, the vehicle is guided back to the trajectory that corresponds to the selected mode.

6. The method as recited in claim 2, wherein the trajectory corresponding to the selected mode is influenced by vehicle-specific influential variables.

7. The method as recited in claim 2, wherein the trajectory corresponding to the selected mode is influenced by environment-specific influential variables.

8. The method as recited in claim 1, wherein:
another one of the styles is a dynamic mode; and
when the defensive mode is selected, the trajectory of the vehicle is established in such a way that:
when driving into the curve of the traffic lane, the vehicle is guided in an oriented manner to the center of the traffic lane;
at the zenith of trajectory of the curve, the vehicle is guided slightly to the inner side of the traffic lane; and
at the exit of the curve, the vehicle is essentially guided again to the center of the traffic lane.

9. A method for controlling a driver assistance system which has sensors for recording the vehicle's environment and a device for intervening in onboard systems of the vehicle as a function of output signals of the sensors, comprising:
the driver assistance system recording at least a course of a travel lane along which the vehicle is traveling and a position of the vehicle with respect to the travel lane, and guiding the vehicle on a trajectory;
wherein:
the driver assistance system establishes the trajectory as a function of a driver's request to drive according to a driving style selected from a plurality of profiles, each profile denoting a respective driving style, one of the styles being a defensive mode;

the driver assistance system automatically detects the driver's request by detecting a manner of driving of the driver; and when the defensive mode is selected, the trajectory of the vehicle is established in such a way that:

when driving into a curve of the traffic lane, the vehicle is guided in an oriented manner to the center of the traffic lane;

the vehicle, at a zenith of trajectory of the curve, is guided slightly to an inner side of the traffic lane; and at an exit of the curve, the vehicle is essentially guided again to the center of the traffic lane.

10. A driver assistance system for guiding a vehicle on a trajectory, comprising:

a device configured to:

obtain signals of sensors that record the vehicle's environment;

based on the obtained signals, determine a course of a travel lane along which the vehicle is traveling and a position of the vehicle with respect to the travel lane;

automatically detect, by detecting a manner of driving of a driver, a request of the driver to drive according to a driving style selected from a plurality of profiles, each profile denoting a respective driving style, one of the styles being a dynamic mode;

establish a trajectory as a function of the selected driving style; and guide the vehicle one the established trajectory;

wherein, when the dynamic mode is selected, the trajectory of the vehicle is established in such a way that:

when driving into a curve of the traffic lane, the vehicle is guided in an oriented manner to an outer side of the traffic lane;

at a zenith of trajectory of the curve, the vehicle is guided to an inner side of the traffic lane; and at an exit of the curve, the vehicle is essentially guided to the center of the traffic lane.

11. A driver assistance system for guiding a vehicle on a trajectory, comprising:

a device configured to:

obtain signals of sensors that record the vehicle's environment;

based on the obtained signals, determine a course of a travel lane along which the vehicle is traveling and a position of the vehicle with respect to the travel lane;

automatically detect, by detecting a manner of driving of a driver, a request of the driver to drive according to a driving style selected from a plurality of profiles, each profile denoting a respective driving style, one of the styles being a defensive mode;

establish a trajectory as a function of the selected driving style; and guide the vehicle one the established trajectory;

wherein, when the defensive mode is selected, the trajectory of the vehicle is established in such a way that:

when driving into a curve of the traffic lane, the vehicle is guided in an oriented manner to a center of the traffic lane;

at a zenith of trajectory of the curve, the vehicle is guided slightly to an inner side of the traffic lane; and at an exit of the curve, the vehicle is essentially guided again to the center of the traffic lane.

* * * * *

UNITED STATES PATENT AND TRADEMARK OFFICE
CERTIFICATE OF CORRECTION

PATENT NO.        : 8,700,229 B2                                                  Page 1 of 1
APPLICATION NO.   : 12/735112
DATED             : April 15, 2014
INVENTOR(S)       : Ulrich Seger It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 830 days.

Signed and Sealed this

Twenty-ninth Day of September, 2015

Michelle K. Lee
*Director of the United States Patent and Trademark Office*